(12) United States Patent
Medsker

(10) Patent No.: US 6,427,739 B1
(45) Date of Patent: Aug. 6, 2002

(54) COUPLING ASSEMBLY

(75) Inventor: Jim Medsker, Lawton, MI (US)

(73) Assignee: Precision Seal, Inc., Spring Lake, MI (US)

( * ) Notice: Subject to any disclaimer, the term of this patent is extended or adjusted under 35 U.S.C. 154(b) by 0 days.

(21) Appl. No.: 09/574,768

(22) Filed: May 19, 2000

(51) Int. Cl.⁷ .......................... B60C 23/10; B60C 29/00
(52) U.S. Cl. ....................................... 152/415; 152/418
(58) Field of Search ............................. 152/415 I, 416, 152/417, 418

(56) References Cited

U.S. PATENT DOCUMENTS

| | | | |
|---|---|---|---|
| 1,470,446 A | * 10/1923 | Hazelbaker | 152/417 |
| 2,010,250 A | * 8/1935 | Applegate | 152/417 |
| 2,213,539 A | * 9/1940 | Wiegand | 152/416 |
| 3,276,503 A | 10/1966 | Kilmarx | |
| 4,387,931 A | 6/1983 | Bland | |
| 4,685,501 A | 8/1987 | Williams | |
| 4,883,106 A | 11/1989 | Schultz et al. | |
| 5,584,949 A | 12/1996 | Ingram | |
| 5,769,979 A | 6/1998 | Naedler | |
| 6,105,645 A | * 8/2000 | Ingram | 152/415 |
| 6,131,631 A | * 10/2000 | Bradley et al. | 152/417 |
| 6,244,316 B1 | * 6/2001 | Naedler | 152/417 |

* cited by examiner

*Primary Examiner*—S. Joseph Morano
*Assistant Examiner*—Jason R. Bellinger
(74) *Attorney, Agent, or Firm*—King & Jovanovic, PLC

(57) ABSTRACT

A coupling assembly for attachment of an air line to a tire comprising, a first conduit associable with an axle about which a tire rotates, a second conduit associable with a hub of a tire, and means for compensating misalignment of the first conduit relative to the second conduit, to, in turn, accommodate sealed fluid communication of the first conduit and the second conduit.

22 Claims, 3 Drawing Sheets

US 6,427,739 B1

COUPLING ASSEMBLY

BACKGROUND OF THE INVENTION

1. Field of the Invention

The present invention relates in general to a coupling assembly, and more particularly, to a coupling assembly for use in association with an air line of a tire inflation system.

2. Background Art

Tire inflation systems and components associated therewith have been known in the art for years and are the subject of numerous patents including: U.S. Pat. No. 5,769,979; U.S. Pat. No. 5,584,949; U.S. Pat. No. 4,883,106; U.S. Pat. No. 4,685,501; U.S. Pat. No. 4,387,931; and U.S. Pat. No. 3,276,503. While tire inflation systems have become commercially available for use in association with vehicles, the cost, reliability, and longevity of these tire inflation systems remains largely problematic.

It is therefore an object of the present invention to provide a low-cost, reliable coupling assembly for use in association with a tire inflation system which remedies the detriments and/or complications associated with conventional tire inflation systems.

These and other objects of the present invention will become apparent in light of the present specification, claims, and drawings.

SUMMARY OF THE INVENTION

The present invention is directed to a coupling assembly for attachment of an air line to a tire comprising: (a) a first conduit associable with an axle about which a tire rotates; (b) a second conduit associable with a hub of a tire; and (c) means for compensating misalignment of the first conduit relative to the second conduit, to, in turn, accommodate sealed fluid communication of the first conduit and the second conduit.

In a preferred embodiment of the invention, the misalignment compensating means comprises means for flexibly mounting the first conduit to the axle. In this embodiment, the means for flexibly mounting the first conduit to the axle comprises a flexible mount which facilitates sealed pivoting of the first conduit about a first end thereof.

In another preferred embodiment of the invention, the misalignment compensating means comprises means for flexibly connecting the first conduit to the second conduit. In this embodiment, the means for flexibly connecting comprises a flexible conduit having a greater flexibility than at least of portion of each the first and second conduits. The flexible conduit may optionally include a bulge region.

In yet another preferred embodiment of the invention, the flexible conduit is attached to at least one of the outside and/or the inside surfaces of the first conduit and/or the second conduit. Preferably, the first conduit and the second conduit comprise a substantially circular cross-section. The flexible conduit may additionally comprise a substantially circular cross-section.

In accordance with the present invention, the misalignment compensating means may comprise: (a) means for flexibly mounting the first conduit to an axle; and (b) means for flexibly connecting the first conduit to the second conduit.

The present invention is also directed to a coupling assembly for attachment of an air line to a tire comprising: (a) a conduit having a first end attachable to an air line so as to be in fluid communication therewith, and a second end positionable so as to extend at least partially through an opening in a hub of the pneumatic tire; (b) at least one seal positioned between the conduit and the opening in the hub to, in turn, define at least one volume therebetween; and (c) means for venting the volume in fluid communication to surrounding ambient conditions.

In a preferred embodiment of the invention, the venting means extends through one of the hub and the at least one seal. Such seal(s) may comprise lip seals and/or mechanical seals. Alternatively, the venting means may comprise a conduit extending through the hub.

BRIEF DESCRIPTION OF THE DRAWINGS

The invention will now be described with reference to the drawings wherein.

DETAILED DESCRIPTION OF THE INVENTION

Figure 1:
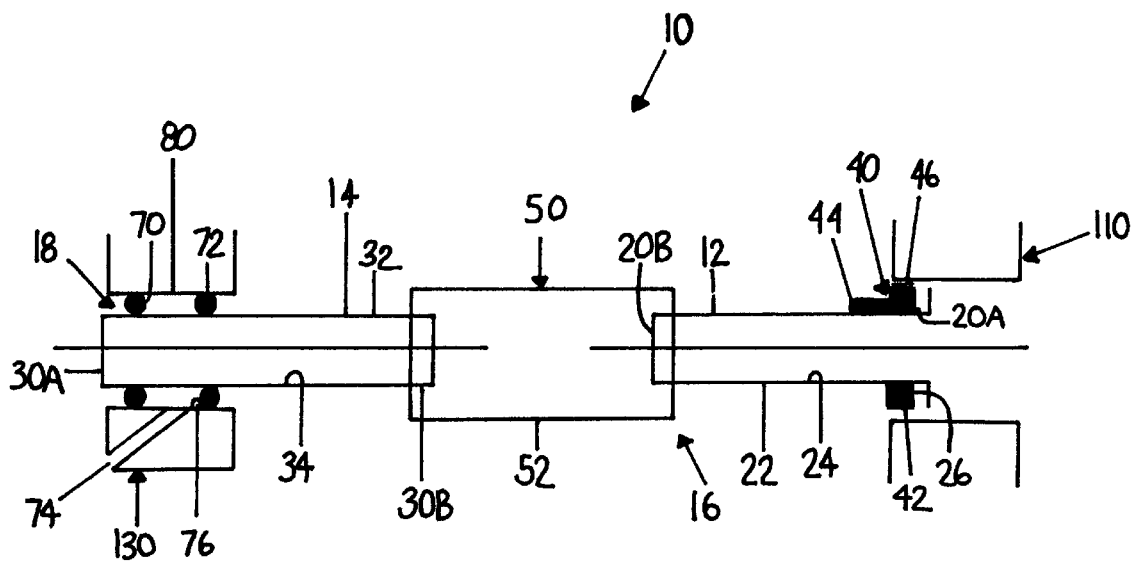
FIG. 1 of the drawings is a cross-sectional view of a coupling assembly in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Figure 2:
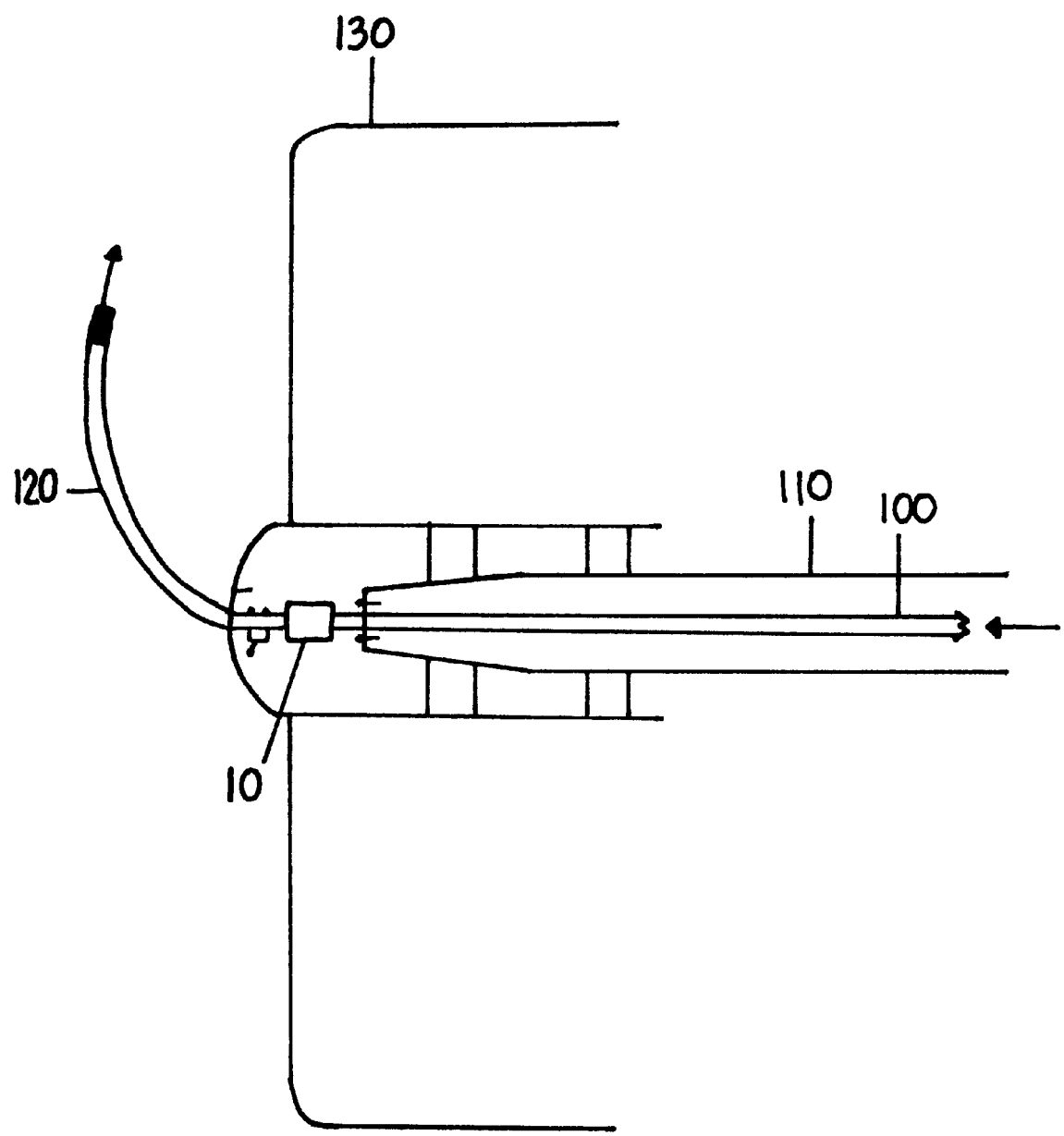
FIG. 2 of the drawings is a side-elevational view of an coupling assembly in a pneumatic tire environment.

Referring now to the drawings and to FIG. 1 in particular, a cross-sectional schematic representation of coupling assembly 10 is shown, which generally comprises first conduit 12, second conduit 14, misalignment compensating means 16, and rotary union 18. It will be understood that FIG. 1 is merely a schematic representation of coupling assembly 10. As such, some of the components have been distorted from their actual scale for pictorial clarity. As is shown in FIG. 2, coupling assembly 10 is primarily intended for use in association with a pneumatic tire inflation system which is adaptable to a vehicle (car, truck, tractor, trailer, etc.) to couple air line 100, extending through axle 110, to hose 120, and, in turn, to a tire which is mounted on hub 130.

Referring again to FIG. 1, first conduit 12 includes first end 20A, second end 20B, outer surface 22 and inner surface 24. First end 20A of first conduit 12 includes retaining lip 26 which is associated with axle 110. First conduit 12 generally comprises a seamless tubular material that is preferably substantially resistant to corrosion. However, the conduit is not limited to such a material, and other materials, such as other metals and alloys as well as composites and plastics are contemplated for use. Such a material may comprise a substantially circular seamless stainless steel tubing having a particular inner diameter and a particular wall thickness. While not limited thereto, the inner diameter of the air lines and the conduits are on the order of 3/16 of an inch.

As is shown in FIG. 1, second conduit 14 generally comprises first end 30A, second end 30B, outer surface 32 and inner surface 34. First end 30A of second conduit 14 is associated with hub 130. As can be further seen in FIG. 1, second end 30B of second conduit 14 is associated with second end 20B of first conduit 12, such that the longitudinal axis of each of first conduit 12, second conduit 14 and the axle 110 are substantially co-linear. It will be understood that second conduit 14 can be fabricated from the same or similar materials as that of first conduit 12.

Misalignment compensating means 16 comprises flexible mounting means 40 for flexibly associating first conduit 12 to axle 110 and flexible connecting means 50 for flexibly associating first conduit 12 to second conduit 14, either directly or indirectly. Due to tolerances and variations in the manufacturing process, the longitudinal axis of each of first conduit 12, second conduit 14, and axle 110 are not generally perfectly aligned in a co-linear configuration. Accordingly, misalignment compensating means 16 compensates for these variations and tolerances to, in turn, insure the integrity of the conduit.

As is shown in FIG. 1, flexible mounting means 40 generally comprises a flexible mount 42 extending between first end 20A of first conduit 12 and axle 110 which is, in turn, associated with air line 100 (See FIG. 2). Flexible mount 42 permits the first conduit to pivot substantially transversely about first end 20A, while maintaining an effective seal between axle 110 and the same. Flexible mount 42 comprises rubberized material 44 and stability rim 46. Stability rim 46 provides integrity to rubberized material 44 and provides a means by which to attach flexible mount 42 to axle 110. Of course, other configurations are likewise contemplated for use. For example, flexible mount 42 may comprise a rubberized material that does not include a rubberized rim. In other embodiments, the flexible mount may comprise a boot which extends over each of axles 110 and first 12 conduit. In addition, it will be understood that other variations that would be known to those having ordinary skill in the art are likewise contemplated for use.

Preferably, flexible connecting means 50 comprises flexible conduit 52 which connects second end 20B of first conduit 12 to second end 30B of second conduit 14 in a substantially fluid tight connection. Specifically, flexible conduit 52 comprises a material having a portion which is more flexible than either of the first and second conduits, such as molded rubber compounds, natural and synthetic resins and/or composites. In certain embodiments the material may comprise a composite which includes reinforcement means, such as, for example, woven or non-woven mesh. As is best shown in FIG. 1, flexible conduit 52 may be dimensionally configured so as to comprise a substantially uniform cross-section.

Figure 3:
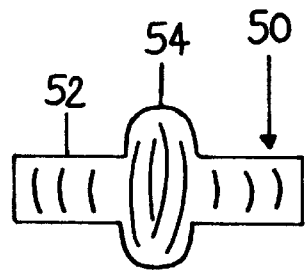
FIG. 3 of the drawings is a side-elevational view of an embodiment of a flexible connector in accordance with the present invention.

Alternatively, as is shown in FIG. 3, flexible conduit 52 may include bulge region 54 which is of a larger cross-sectional area than the general remainder of the flexible conduit. Such a configuration compensates for misalignment of first conduit 12 and/or second conduit 14, even in situations where the magnitude of misalignment may be larger than is observed during normal operation of an associated vehicle.

As can be seen in FIG. 1, flexible conduit 52 is generally positioned so as to overlie outer surface 22 of first conduit 12 and outer surface 32 of second conduit 14. In another embodiment, flexible conduit 52 may be positioned on inner surface 24 of first conduit 12 and inner surface 34 of second conduit 14. In further embodiments, the flexible conduit may be positioned on the inside and/or outside of first conduit 12 and/or second conduit 14, respectively.

Figure 4:
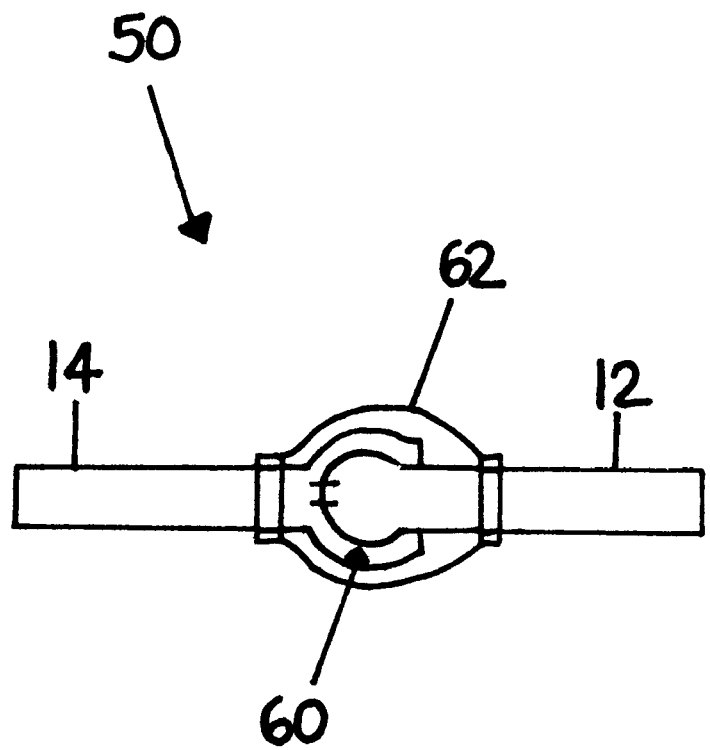
FIG. 4 of the drawings is a cross-sectional view of an embodiment of flexible connecting means in accordance with the present invention.

Alternatively, and as is shown in FIG. 4, flexible connecting means 50 may comprise ball joint 60, which may or may not be covered by a rubber boot, such as boot 62. In other embodiments, multiple components can be utilized to attach the first conduit to the second conduit so as to compensate for the misalignment thereof.

Referring now back to FIG. 1, rotary union 18 generally comprises first seal 70, second seal 72 and venting means 74. First seal 70 and second seal 72 are positioned toward first end 30A of second conduit 14 to provide a fluid tight seal between outer surface 32 of second conduit 14 and hub 130. The first and second seals are distally spaced apart so as to define volume 80 therebetween. The seals generally comprise lip seals which permit rotation of second conduit 14 relative to hub 130 while retaining the integrity of the seal. The lip seals may comprise various rubbers and other natural and synthetic resins and/or composites which are capable of providing an effective seal over millions of rotative cycles. While two seals have been shown, for illustrative purposes only, it will be understood that a single seal or multiple seals (i.e. more than two) can be utilized. Additionally, other seals, such as mechanical (carbon) seals are contemplated for use in accordance with the present invention.

Venting means 74 provides fluid communication between volume 80 and ambient/external conditions. In the embodiment illustrated, venting means 74 comprises a conduit which extends from hub opening 76 through hub 130 to the outside surface of the hub. In other embodiments, the venting means may comprise a small conduit which extends through one of the lip seals. It will be understood that if more than two seals are used, the volume between any two seals can be vented.

As will be explained, if one of the first and second seals 70 and 72, respectively, undesirably degrades, it is possible for moisture and contaminants to enter volume 80, and subsequently air line 100 (See FIG. 2). Entry of these contaminants and moisture into an associated tire (not shown) can materially reduce the life of the tire and lead to premature failure thereof. Venting means facilitates the release of moisture and/or other contaminants that may enter into volume 80, so that these contaminants are removed into the ambient/external environment so as to reduce the risk that any contaminants enter into the tire. As will be understood the rotating coupling, and the venting means are likewise applicable to embodiments that do not include any flexible coupling means.

To install coupling assembly 10, the operator first attaches first conduit 12 to flexible mounting means 40. Next, flexible mounting means 40 is attached to axle 110 (which has already been associated with air line 100). More specifically, first end 20A of first flexible conduit 12 is attached to flexible mount 42 so that lip 26 abuts the outer surface thereof. As was previously explained, flexible mounting means 40 allows for a certain amount of pivoting of first conduit 12 about its first end.

After first conduit 12 is operatively positioned, flexible connecting means 50 is attached to second end 20B of first conduit 12. Subsequently, lip seals 70 and 72 are positioned in the desired locations in hub 130. Once positioned, second conduit 14 is slid into position so as to extend through hub 130 and into flexible connecting means 50. Once fully positioned, a tire (not shown) is placed in fluid communication with first end 30A of second conduit 14 by way of a rotatably coupled air line 100 (See FIG. 2). Of course, the conduit is not limited to the use of any particular air line.

In operation, air line 100 is capable of providing air at a desired pressure (i.e. 100 psi) through coupling assembly 10 to a tire mounted on hub 130. Air line 100 and the flow therethrough can be manually controlled by the user in the cab of a vehicle, or alternatively, controlled by an automated system. Various control systems for controlling the flow of air into the tire are known in the art, and the system is not limited to any one particular method or control system.

As the hub and the tire rotate, due to variations and tolerances, the axis of rotation of each of the hub, the axle, and the first and second conduits may be misaligned so that they are not perfectly co-linear. The flexible connector and the flexible rubber mount compensate for the misalignment of the various components and maintain the integrity of the coupling—essentially compensating for the variations in the respective longitudinal axis of rotation.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A coupling assembly for attachment of an air line to a tire, comprising:
    a first conduit, associable with an axle about which a tire rotates;
    a second conduit, associable with a hub of a wheel; and
    means for compensating misalignment of the first conduit relative to the second conduit to accommodate sealed fluid communication of the first conduit and the second conduit, wherein the misalignment compensating means comprises means for flexibly mounting the first conduit to the axle.

2. The coupling assembly of claim 1, wherein the means for flexibly mounting the first conduit to the axle comprises a flexible mount which facilitates sealed pivoting of the first conduit about a first end thereof.

3. The coupling assembly of claim 1, where the misalignment compensating means further comprises means for flexibly connecting the first conduit to the second conduit.

4. The coupling assembly of claim 3, wherein the means for flexibly connecting comprises a flexible conduit having a greater flexibility than at least a portion of each of the first and second conduits.

5. The coupling assembly of claim 3, wherein the means for flexibly connecting the first conduit to the second conduit comprises a bulge positioned therebetween.

6. The coupling assembly of claim 3, wherein the flexible conduit is attached to at least one of an outside surface and an inside surface of each of the first conduit and the second conduit.

7. The coupling assembly of claim 6, wherein the flexible conduit is attached to the outside surfaces of both the first conduit and the second conduit.

8. The coupling assembly of claim 3, wherein the first conduit and the second conduit comprises a substantially circular cross section.

9. The coupling assembly of claim 3, wherein the flexible conduit additionally comprises a substantially circular cross section.

10. The coupling assembly of claim 1, wherein the misalignment compensating means comprises:
    means for flexibly mounting the first conduit to an axle; and
    means for flexibly connecting the first conduit to the second conduit.

11. A coupling assembly for attachment of an air line to a tire, comprising:
    a conduit having a first end, attachable to an air line so as to be in fluid communication therewith, and a second end, positionable so as to extend at least partially through an opening in a hub of a pneumatic wheel;
    at least one seal positioned between the conduit and the opening in the hub to define at least one volume therebetween; and
    means for venting the volume in fluid communication to surrounding ambient conditions.

12. The coupling assembly of claim 11, wherein the venting means extends through one of the hub and the at least one seal.

13. The coupling assembly of claim 11, wherein the venting means comprises a conduit extending through the hub.

14. The coupling assembly of claim 11, wherein the at least one seal comprises two lip seals.

15. The coupling assembly of claim 11, wherein the at least one seal comprises two mechanical seals.

16. The coupling assembly of claim 11, wherein the at least one seal comprises two seals.

17. The coupling assembly of claim 11, wherein the assembly additionally comprises:
    a first conduit, associable with an axle about which a pneumatic tire rotates;
    a second conduit, associable with a hub of a wheel; and
    means for compensating misalignment of the first conduit relative to the second conduit to accommodate sealed fluid communication of the first and the second conduit.

18. The coupling assembly of claim 17, wherein the misalignment compensating means comprises means for flexibly mounting the first conduit to the axle.

19. The coupling assembly of claim 18, wherein the misalignment compensating means comprises means for flexibly connecting the first conduit to the second conduit.

20. A coupling assembly for attachment of an air line to a tire, comprising:
    a first conduit, associable with an axle about which a tire rotates;
    a second conduit, associable with a hub of a tire; and
    means for compensating misalignment of the first conduit relative to the second conduit, to, in turn, accommodate sealed fluid communication of the first conduit and the second conduit, wherein the misalignment compensating means further comprises means for flexibly connecting the first conduit to the second conduit, and further wherein the means for flexibly connecting the first conduit to the second conduit comprises a bulge positioned therebetween.

21. A coupling assembly for attachment of an air line to a tire, comprising:
    a first conduit, associable with an axle about which a tire rotates;
    a second conduit, associable with a hub of a tire; and
    means for compensating misalignment of the first conduit relative to the second conduit, to, in turn, accommodate sealed fluid communication of the first conduit and the second conduit, wherein the misalignment compensating means further comprises means for flexibly connecting the first conduit to the second conduit, wherein the flexible conduit is attached to outside surfaces of both the first conduit and the second conduit.

22. A coupling assembly for attachment of an air line to a tire, comprising:
    a first conduit, associable with an axle about which a tire rotates;

a second conduit, associable with a hub of a tire; and means for compensating misalignment of the first conduit relative to the second conduit, to, in turn, accommodate sealed fluid communication of the first conduit and the second conduit, wherein the misalignment means comprises:

means for flexibly mounting the first conduit to an axle; and means for flexibly connecting the first conduit to the second conduit.

* * * * *